United States Patent
Oberoi et al.

(10) Patent No.: US 6,847,378 B2
(45) Date of Patent: Jan. 25, 2005

(54) SYSTEM AND METHOD FOR PERFORMING SCALE AND BIAS OPERATIONS BY PRECLAMPING INPUT IMAGE DATA

(75) Inventors: Ranjit S. Oberoi, Saratoga, CA (US); Michael G. Lavelle, Saratoga, CA (US); Anthony S. Ramirez, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 145 days.

(21) Appl. No.: 10/093,364

(22) Filed: Mar. 7, 2002

(65) Prior Publication Data

US 2003/0169274 A1 Sep. 11, 2003

(51) Int. Cl.[7] .................................................. G09G 5/02
(52) U.S. Cl. ....................... 345/600; 345/522; 345/660; 708/137; 708/208; 708/209; 708/495
(58) Field of Search ................................ 345/590, 522; 708/137, 208, 501

(56) References Cited

U.S. PATENT DOCUMENTS

| | | | | |
|---|---|---|---|---|
| 4,620,292 A | * | 10/1986 | Hagiwara et al. | 708/501 |
| 5,943,058 A | * | 8/1999 | Nagy | 345/582 |
| 6,452,601 B1 | * | 9/2002 | Marino et al. | 345/538 |
| 6,559,856 B1 | * | 5/2003 | Fossum et al. | 345/600 |
| 6,570,576 B1 | * | 5/2003 | McIntyre et al. | 345/600 |
| 6,614,489 B1 | * | 9/2003 | McIntyre | 348/708 |

FOREIGN PATENT DOCUMENTS

JP        05-040606    *    2/1993    ............. G06F/7/52

* cited by examiner

*Primary Examiner*—Matthew C. Bella
*Assistant Examiner*—Antonio A Caschera
(74) *Attorney, Agent, or Firm*—Meyertons Hood Kivlin Kowert & Goetzel, P.C.; Jeffrey C. Hood

(57) ABSTRACT

In one embodiment, a scale and bias unit for use in a graphics system includes a preclamping unit configured to receive an input and to responsively generate an output value equal to a first value if the input is within a first input range. The scale and bias unit also includes a processing unit coupled to the preclamping unit and configured to perform a calculation on the input to generate the output value. The processing unit does not perform the calculation if the input is within the first input range.

11 Claims, 14 Drawing Sheets

Color matrix:

$$\begin{bmatrix} m1 & m5 & m9 & m13 \\ m2 & m6 & m10 & m14 \\ m3 & m7 & m11 & m15 \\ m4 & m8 & m12 & m16 \end{bmatrix}$$

Input = (R,G,B,A)

Output = (R',G',B',A'), where:

R' = (m1·R + m5·G + m9·B + m13·A)·Rscale + Rbias
G' = (m2·R + m6·G + m10·B + m14·A)·Gscale + Gbias
B' = (m3·R + m7·G + m11·B + m15·A)·Bscale + Bbias
A' = (m4·R + m8·G + m12·B + m16·A)·Ascale + Abias

FIG. 12A

Color matrix:

$$\begin{bmatrix} n1 & n5 & n9 & n13 \\ n2 & n6 & n10 & n14 \\ n3 & n7 & n11 & n15 \\ n4 & n8 & n12 & n16 \end{bmatrix}$$

Input = (R,G,B,A)

Output = (R',G',B',A'), where:

R' = (n1·R + n5·G + n9·B + n13·A) + Rbias
G' = (n2·R + n6·G + n10·B + n14·A) + Gbias
B' = (n3·R + n7·G + n11·B + n15·A) + Bbias
A' = (n4·R + n8·G + n12·B + n16·A) + Abias

FIG. 12B

SYSTEM AND METHOD FOR PERFORMING SCALE AND BIAS OPERATIONS BY PRECLAMPING INPUT IMAGE DATA

BACKGROUND OF THE INVENTION

1. Field of the Invention

This invention relates generally to the field of computer graphics and, more particularly, to performing scale and/or bias operations in a computer graphics system.

2. Description of the Related Art

A computer system typically relies upon its graphics system for producing visual output on the computer screen or display device. Early graphics systems were only responsible for taking what the processor produced as output and displaying it on the screen. In essence, they acted as simple translators or interfaces. Modern graphics systems, however, incorporate graphics processors with a great deal of processing power. They now act more like coprocessors rather than simple translators. This change is due to the recent increase in both the complexity and amount of data being sent to the display device. For example, modern computer displays have many more pixels, greater color depth, and are able to display more complex images with higher refresh rates than earlier models. Similarly, the images displayed are now more complex and may involve advanced techniques such as anti-aliasing and texture mapping.

As a result, without considerable processing power in the graphics system, the CPU would spend a great deal of time performing graphics calculations. This could rob the computer system of the processing power needed for performing other tasks associated with program execution and thereby dramatically reduce overall system performance. With a powerful graphics system, however, when the CPU is instructed to draw a box on the screen, the CPU is freed from having to compute the position and color of each pixel. Instead, the CPU may send a request to the video card stating "draw a box at these coordinates." The graphics system then draws the box, freeing the processor to perform other tasks.

Generally, a graphics system in a computer (also referred to as a graphics system) is a type of video adapter that contains its own processor to boost performance levels. These processors are specialized for computing graphical transformations, so they tend to achieve better results than the general-purpose CPU used by the computer system. In addition, they free up the computer's CPU to execute other commands while the graphics system is handling graphics computations. The popularity of graphical applications, and especially multimedia applications, has made high performance graphics systems a common feature of computer systems. Most computer manufacturers now bundle a high performance graphics system with their systems.

Since graphics systems typically perform only a limited set of functions, they may be customized and therefore far more efficient at graphics operations than the computer's general-purpose central processor. While early graphics systems were limited to performing two-dimensional (2D) graphics, their functionality has increased to support three-dimensional (3D) wire-frame graphics, 3D solids, and now includes support for three-dimensional (3D) graphics with textures and special effects such as advanced shading, fogging, alpha-blending, and specular highlighting.

A modern graphics system may generally operate as follows. First, graphics data is initially read from a computer system's main memory into the graphics system. The graphics data may include geometric primitives such as polygons (e.g., triangles), NURBS (Non-Uniform Rational B-Splines), sub-division surfaces, voxels (volume elements) and other types of data. The various types of data are typically converted into triangles (e.g., three vertices having at least position and color information). Then, transform and lighting calculation units receive and process the triangles. Transform calculations typically include changing a triangle's coordinate axis, while lighting calculations typically determine what effect, if any, lighting has on the color of triangle's vertices. The transformed and lit triangles may then be conveyed to a clip test/back face culling unit that determines which triangles are outside the current parameters for visibility (e.g., triangles that are off screen). These triangles are typically discarded to prevent additional system resources from being spent on non-visible triangles.

Next, the triangles that pass the clip test and back-face culling may be translated into screen space. The screen space triangles may then be forwarded to the set-up and draw processor for rasterization. Rasterization typically refers to the process of generating actual pixels (or samples) by interpolation from the vertices. The rendering process may include slopes of edges of the polygon or triangle, and then calculating pixels or samples on these edges based on these interpolated slopes. Pixels or samples may also be calculated in the iinterior of the polygon or triangle.

As noted above, in some cases samples are generated by the rasterization process instead of pixels. A pixel typically has a one-to-one correlation with the hardware pixels present in a display device, while samples are typically more numerous than the hardware pixel elements and need not have any direct correlation to the display device. Where pixels are generated, the pixels may be stored into a frame buffer, or possibly provided directly to refresh the display. Where samples are generated, the samples may be stored into a sample buffer or frame buffer. The samples may later be accessed and filtered to generate pixels, which may then be stored into a frame buffer, or the samples may possibly be filtered to form pixels that are provided directly to refresh the display without any intervening frame buffer storage of the pixels.

The pixels are converted into an analog video signal by digital-to-analog converters. If samples are used, the samples may be read out of sample buffer or frame buffer and filtered to generate pixels, which may be stored and later conveyed to digital to analog converters. The video signal from converters is conveyed to a display device such as a computer monitor, LCD display, or projector.

A graphics system may perform scale and bias operations in order to adjust the colors of images and/or to select and expand a small range of values in a particular input image. Scale and bias operations are typically controlled with several floating point values (e.g., a scale and a bias for each channel). Scale and bias operations that may be performed on pixels in the pixel transfer pipeline may be specified in OpenGL: glPixelTransfer<pname>, <value>(<pname>, <value>); where <pname> specifies GL_RED_SCALE, GL_RED_BIAS, GL_GREEN_SCALE, GL_GREEN_BIAS, GL_BLUE_SCALE, GL_BLUE_BIAS, GL_ALPHA_SCALE, or GL_ALPHA_BIAS. Other scale and bias operations may be used to perform color matrix extension (SGI_color_matrix) and convolution extension (EXT_convolution). Since scale and bias operations may be performed several times in the pixel transfer pipeline, it is desirable to increase the efficiency of these operations.

SUMMARY OF THE INVENTION

Various embodiments of systems and methods of performing scale and bias operations by preclamping input image data are disclosed. In one embodiment, a scale and bias unit for use in a graphics system includes a preclamping unit configured to receive an input and to responsively generate an output value equal to a first value if the input is within a first input range. The scale and bias unit also includes a processing unit coupled to the preclamping unit and configured to perform a calculation on the input to generate the output value. The processing unit does not perform the calculation if the input is within the first input range. The preclamping unit may also be configured to responsively generate the output value equal to a second value if the input is within a second input range. If so, the processing unit may be configured to not perform the calculation if the input is within the second input range.

In one embodiment, the first range of inputs may be a range of inputs greater than or equal to a high input value. The preclamping unit may be configured to subtract the high input value from the input to generate a first difference and to detect that the input is within the first range of inputs if the first difference is greater than zero. Similarly, the second range of inputs may be a range of inputs less than or equal to a low input value. The preclamping unit may be configured to subtract the low input value from the input to generate a second difference and to detect that the input is within the second range of inputs if the second difference is less than or equal to zero. The processing unit may be coupled to receive the second difference from the preclamping unit and to multiply the first difference by a scale value to generate the output value if the input is not within the first and the second input ranges.

In one embodiment, the first range of inputs may be a range of inputs greater than or equal to a high input value. The preclamping unit may be configured to subtract the high input value from the input to generate a first difference and to detect that the input is within the first range of inputs if the first difference is greater than zero. Similarly, the second range of inputs may be a range of inputs less than or equal to a low input value. The preclamping unit may be configured to subtract the low input value from the input to generate a second difference and to detect that the input is within the second range of inputs if the second difference is less than or equal to zero. The processing unit may be coupled to receive the second difference from the preclamping unit and to multiply the first difference by a scale value to generate the output value if the input is not within the first and the second input ranges.

BRIEF DESCRIPTION OF THE DRAWINGS

A better understanding of the present invention can be obtained when the following detailed description is considered in conjunction with the following drawings, in which:

FIGS. 12A and 12B show exemplary color matrixes that may be used in various embodiments of a graphics system.

Figure 1:
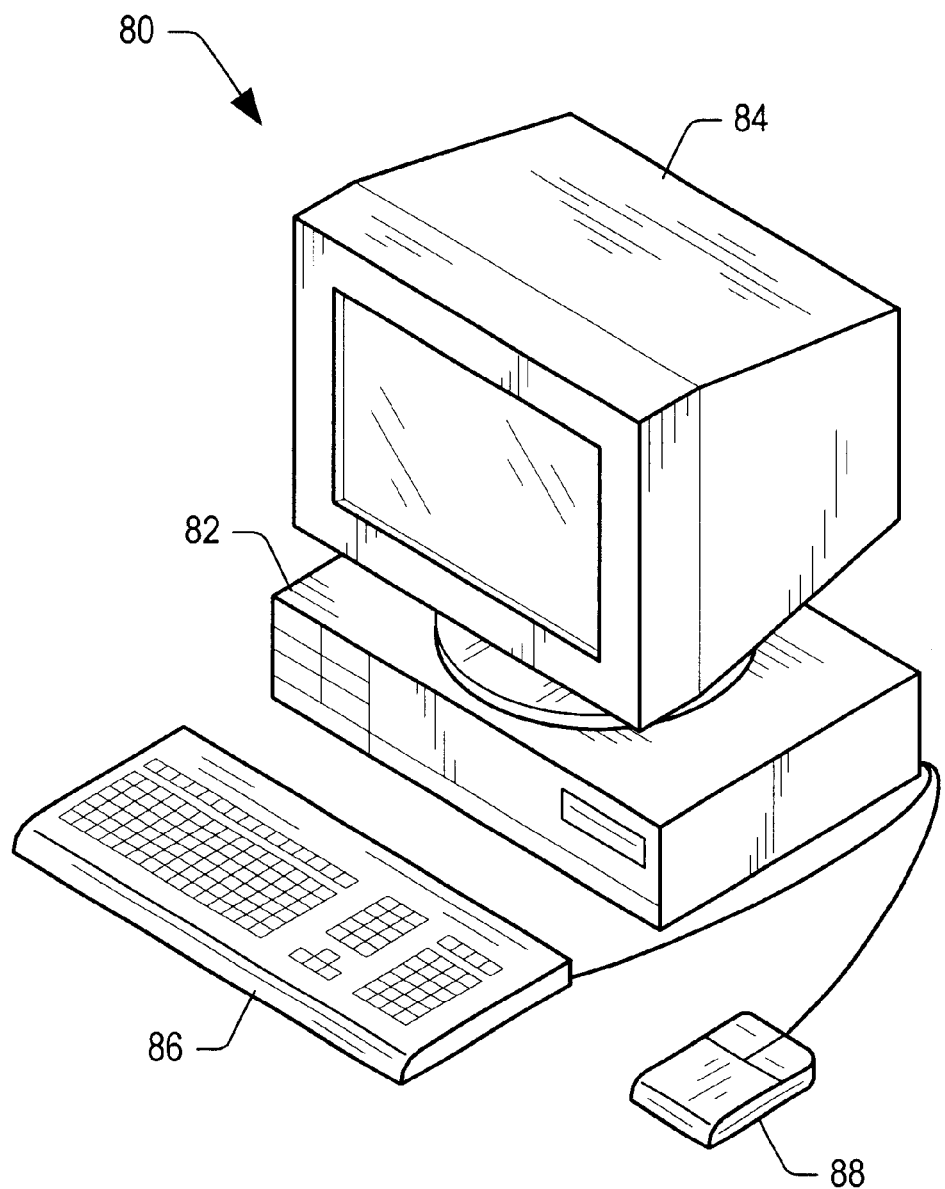
FIG. 1 is a perspective view of one embodiment of a computer system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must)." The term "include", and derivations thereof, mean "including, but not limited to". The term "connected" means "directly or indirectly connected", and the term "coupled" means "directly or indirectly connected".

DETAILED DESCRIPTION OF EMBODIMENTS

Computer System-FIG. 1

FIG. 1 illustrates one embodiment of a computer system 80 that includes a graphics system. The graphics system may be included in any of various systems such as computer systems, network PCs, Internet appliances, televisions (e.g. HDTV systems and interactive television systems), personal digital assistants (PDAs), virtual reality systems, and other devices that display 2D and/or 3D graphics, among others.

As shown, the computer system 80 includes a system unit 82 and a video monitor or display device 84 coupled to the system unit 82. The display device 84 may be any of various types of display monitors or devices (e.g., a CRT, LCD, or gas-plasma display). Various input devices may be connected to the computer system, including a keyboard 86 and/or a mouse 88, or other input device (e.g., a trackball, digitizer, tablet, six-degree of freedom input device, head tracker, eye tracker, data glove, or body sensors). Application software may be executed by the computer system 80 to display graphical objects on display device 84.

Figure 2:
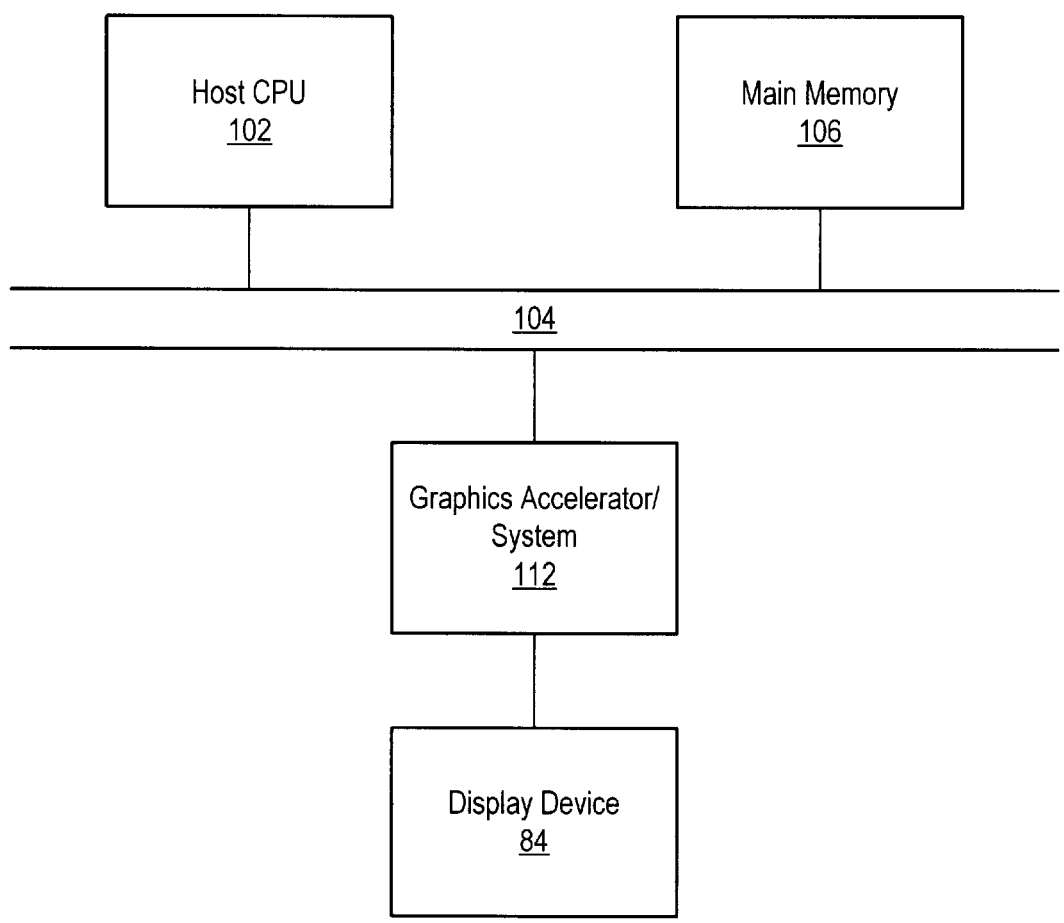
FIG. 2 is a simplified block diagram of one embodiment of a computer system.

Computer System Block Diagram-FIG. 2

FIG. 2 is a simplified block diagram illustrating the computer system of FIG. 1. As shown, the computer system 80 includes a central processing unit (CPU) 102 coupled to a high-speed memory bus or system bus 104 also referred to as the host bus 104. A system memory 106 (also referred to herein as main memory) may also be coupled to high-speed bus 104.

Host processor 102 may include one or more processors of varying types, e.g., microprocessors, multi-processors and CPUs. The system memory 106 may include any combination of different types of memory subsystems such as random access memories (e.g., static random access memories or "SRAMs," synchronous dynamic random access memories or "SDRAMs," and Rambus dynamic random access memories or "RDRAMs," among others), read-only memories, and mass storage devices. The system bus or host bus 104 may include one or more communication or host computer buses (for communication between host processors, CPUs, and memory subsystems) as well as specialized subsystem buses.

In FIG. 2, a graphics system 112 is coupled to the high-speed memory bus 104. The graphics system 112 may be coupled to the bus 104 by, for example, a crossbar switch or other bus connectivity logic. It is assumed that various other peripheral devices, or other buses, may be connected to the high-speed memory bus 104. It is noted that the graphics system 112 may be coupled to one or more of the buses in computer system 80 and/or may be coupled to various types of buses. In addition, the graphics system 112 may be coupled to a communication port and thereby directly receive graphics data from an external source, e.g., the Internet or a network. As shown in the figure, one or more display devices 84 may be connected to the graphics system 112.

Host CPU 102 may transfer information to and from the graphics system 112 according to a programmed input/output (I/O) protocol over host bus 104. Alternately, graphics system 112 may access system memory 106 according to a direct memory access (DMA) protocol or through intelligent bus mastering.

A graphics application program conforming to an application programming interface (API) such as OpenGL® or Java 3D™ may execute on host CPU 102 and generate commands and graphics data that define geometric primitives such as polygons for output on display device 84. Host processor 102 may transfer the graphics data to system memory 106. Thereafter, the host processor 102 may operate to transfer the graphics data to the graphics system 112 over the host bus 104. In another embodiment, the graphics system 112 may read in geometry data arrays over the host bus 104 using DMA access cycles. In yet another embodiment, the graphics system 112 may be coupled to the system memory 106 through a direct port, such as the Advanced Graphics Port (AGP) promulgated by Intel Corporation.

The graphics system may receive graphics data from any of various sources, including host CPU 102 and/or system memory 106, other memory, or from an external source such as a network (e.g., the Internet), or from a broadcast medium, e.g., television, or from other sources.

Note while graphics system 112 is depicted as part of computer system 80, graphics system 112 may also be configured as a stand-alone device (e.g., with its own built-in display). Graphics system 112 may also be configured as a single chip device or as part of a system-on-a-chip or a multi-chip module. Additionally, in some embodiments, certain of the processing operations performed by elements of the illustrated graphics system 112 may be implemented in software.

Figure 3:
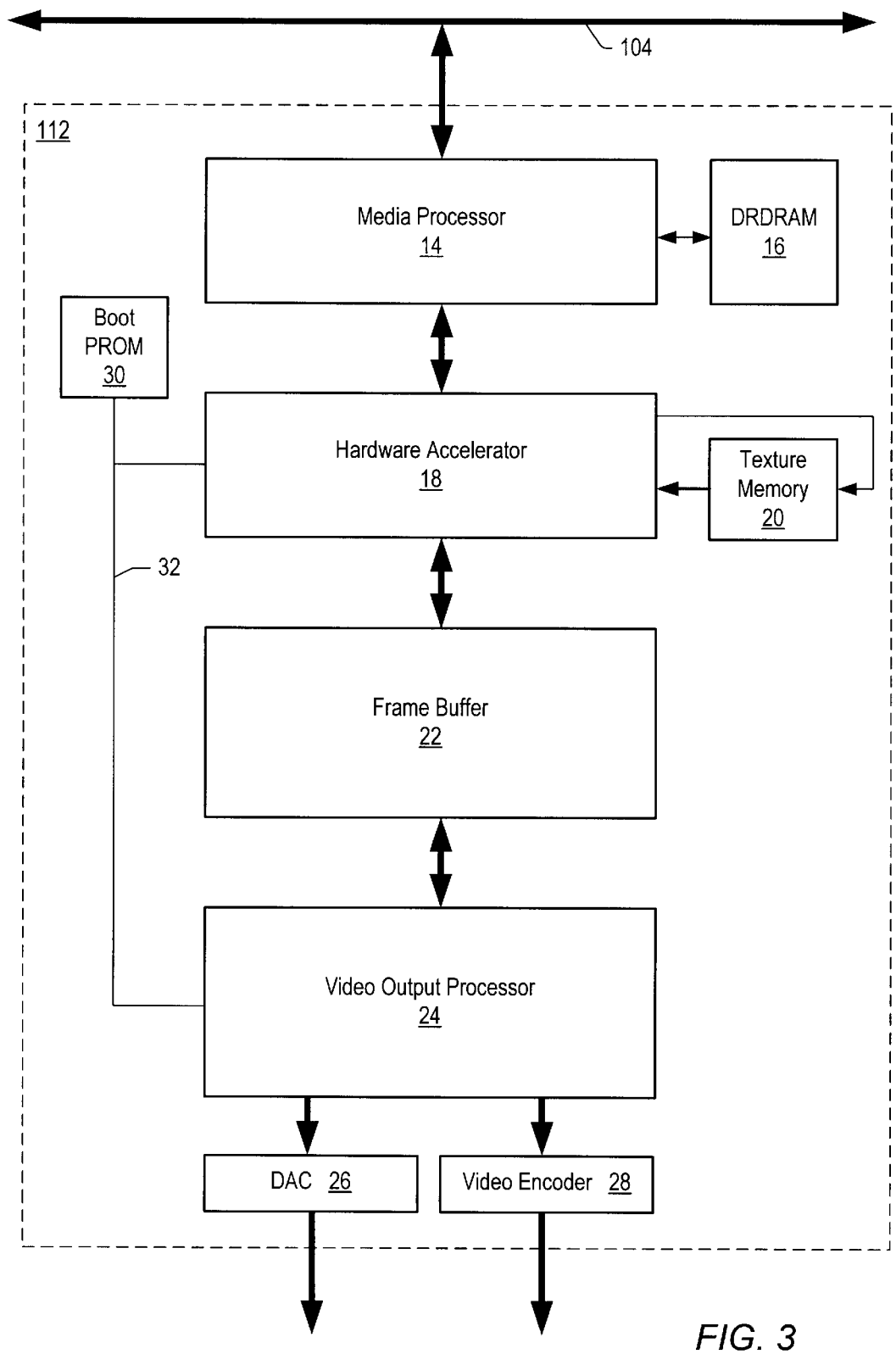
FIG. 3 is a functional block diagram of one embodiment of a graphics system.

Graphics System-FIG. 3

FIG. 3 is a functional block diagram illustrating one embodiment of graphics system 112. Note that many other embodiments of graphics system 112 are possible and contemplated. Graphics system 112 may include one or more media processors 14, one or more hardware accelerators 18, one or more texture buffers 20, one or more frame buffers 22, and one or more video output processors 24. Graphics system 112 may also include one or more output devices such as digital-to-analog converters (DACs) 26, video encoders 28, flat-panel-display drivers (not shown), and/or video projectors (not shown). Media processor 14 and/or hardware accelerator 18 may include any suitable type of high performance processor (e.g., specialized graphics processors or calculation units, multimedia processors, DSPs, or general purpose processors).

In some embodiments, one or more of these components may be removed. For example, the texture buffer may not be included in an embodiment that does not provide texture mapping. In other embodiments, all or part of the functionality incorporated in either or both of the media processor or the hardware accelerator may be implemented in software.

In one set of embodiments, media processor 14 is one integrated circuit and hardware accelerator is another integrated circuit. In other embodiments, media processor 14 and hardware accelerator 18 may be incorporated within the same integrated circuit. In some embodiments, portions of media processor 14 and/or hardware accelerator 18 may be included in separate integrated circuits.

As shown, graphics system 112 may include an interface to a host bus such as host bus 104 in FIG. 2 to enable graphics system 112 to communicate with a host system such as computer system 80. More particularly, host bus 104 may allow a host processor to send commands to the graphics system 112. In one embodiment, host bus 104 may be a bi-directional bus.

Figure 4:
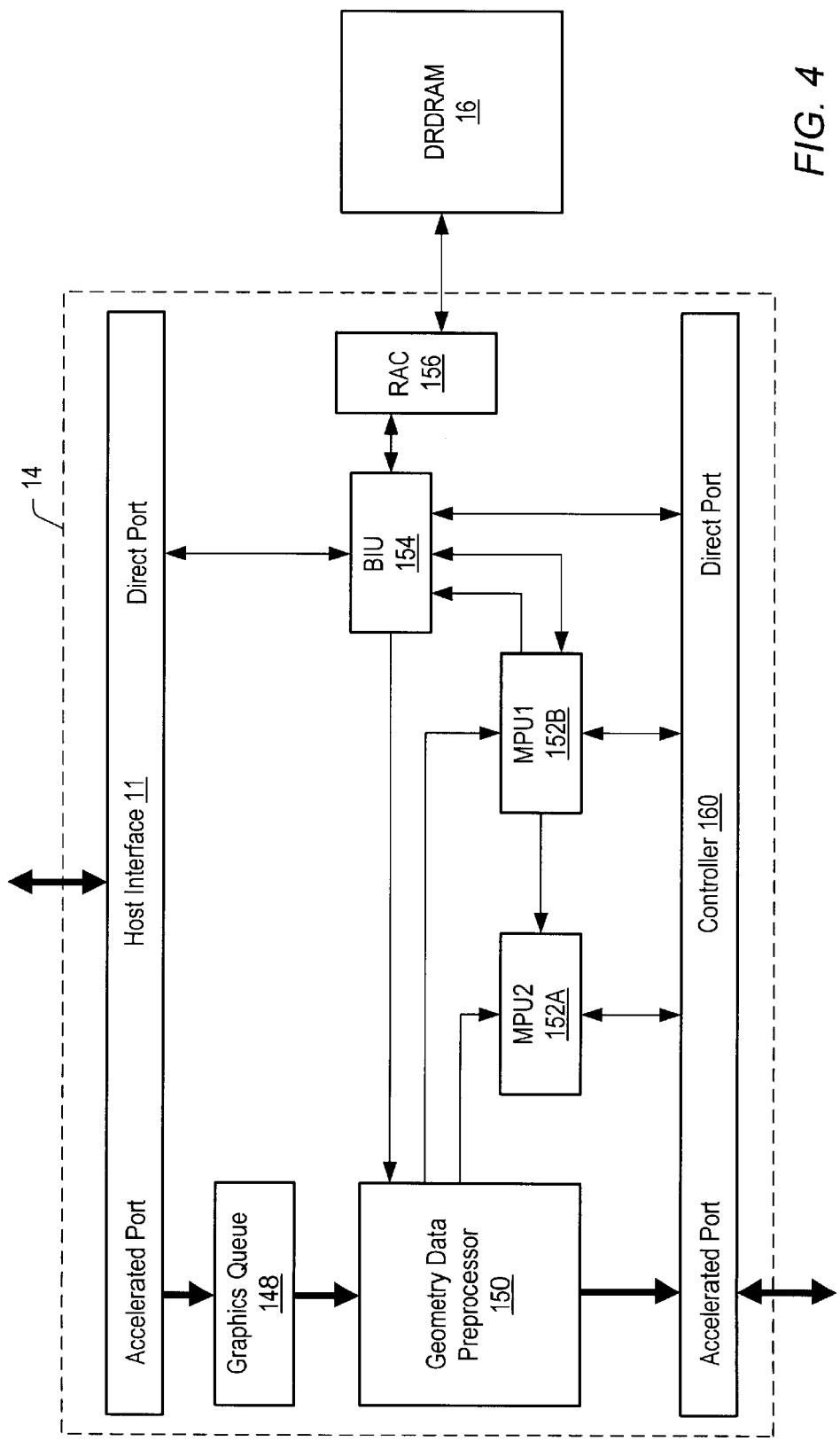
FIG. 4 is a functional block diagram of one embodiment of the media processor of FIG. 3.

Media Processor-FIG. 4

FIG. 4 shows one embodiment of media processor 14. As shown, media processor 14 may operate as the interface between graphics system 112 and computer system 80 by controlling the transfer of data between computer system 80 and graphics system 112. In some embodiments, media processor 14 may also be configured to perform transformations, lighting, and/or other general-purpose processing operations on graphics data.

Transformation refers to the spatial manipulation of objects (or portions of objects) and includes translation, scaling (e.g., stretching or shrinking), rotation, reflection, or combinations thereof. More generally, transformation may include linear mappings (e.g., matrix multiplications), non-linear mappings, and combinations thereof.

Lighting refers to calculating the illumination of the objects within the displayed image to determine what color values and/or brightness values each individual object will have. Depending upon the shading algorithm being used (e.g., constant, Gourand, or Phong), lighting may be evaluated at a number of different spatial locations.

As illustrated, media processor 14 may be configured to receive graphics data via host interface 11. A graphics queue 148 may be included in media processor 14 to buffer a stream of data received via the accelerated port of host interface 11. The received graphics data may include one or more graphics primitives. As used herein, the term graphics primitive may include polygons, parametric surfaces, splines, NURBS (non-uniform rational B-splines), subdivisions surfaces, fractals, volume primitives, voxels (i.e., three-dimensional pixels), and particle systems. In one embodiment, media processor 14 may also include a geometry data preprocessor 150 and one or more microprocessor units (MPUs) 152. MPUs 152 may be configured to perform vertex transformation, lighting calculations and other programmable functions, and to send the results to hardware accelerator 18. MPUs 152 may also have read/write access to texels (i.e., the smallest addressable unit of a texture map) and pixels in the hardware accelerator 18. Geometry data preprocessor 150 may be configured to decompress geometry, to convert and format vertex data, to dispatch vertices and instructions to the MPUs 152, and to send vertex and attribute tags or register data to hardware accelerator 18.

As shown, media processor 14 may have other possible interfaces, including an interface to one or more memories. For example, as shown, media processor 14 may include direct Rambus interface 156 to a direct Rambus DRAM (DRDRAM) 16. A memory such as DRDRAM 16 may be used for program and/or data storage for MPUs 152. DRDRAM 16 may also be used to store display lists and/or vertex texture maps.

Media processor 14 may also include interfaces to other functional components of graphics system 112. For example, media processor 14 may have an interface to another specialized processor such as hardware accelerator 18. In the illustrated embodiment, controller 160 includes an accelerated port path that allows media processor 14 to control hardware accelerator 18. Media processor 14 may also include a direct interface such as bus interface unit (BIU) 154. Bus interface unit 154 provides a path to memory 16 and a path to hardware accelerator 18 and video output processor 24 via controller 160.

Figure 5:
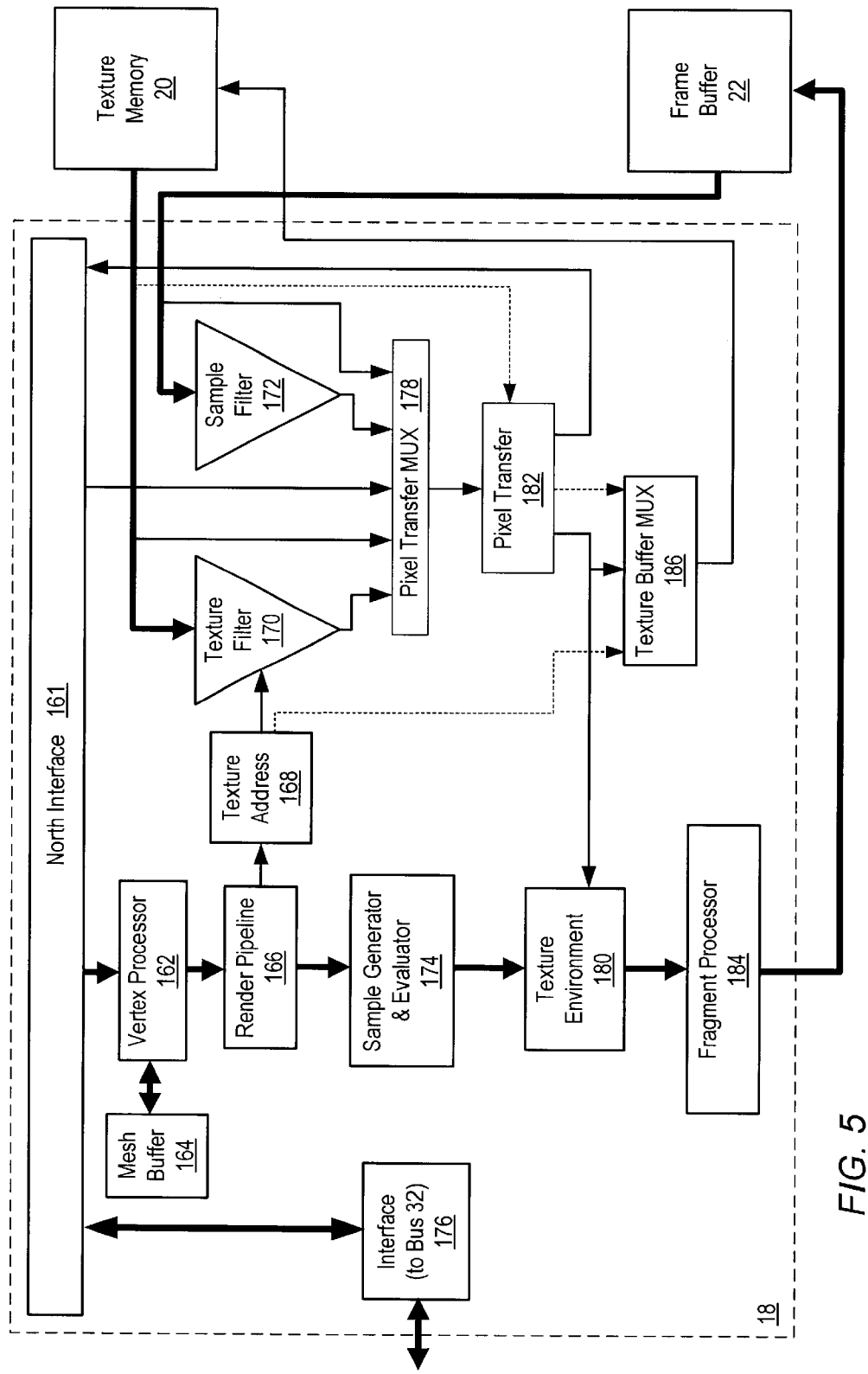
FIG. 5 is a functional block diagram of one embodiment of the hardware accelerator of FIG. 3.

Hardware Accelerator-FIG. 5

One or more hardware accelerators 18 may be configured to receive graphics instructions and data from media processor 14 and to perform a number of functions on the received data according to the received instructions. For example, hardware accelerator 18 may be configured to perform rasterization, 2D and/or 3D texturing, pixel transfers, imaging, fragment processing, clipping, depth cueing, transparency processing, set-up, and/or screen space rendering of various graphics primitives occurring within the graphics data.

Clipping refers to the elimination of graphics primitives or portions of graphics primitives that lie outside of a 3D view volume in world space. The 3D view volume may represent that portion of world space that is visible to a virtual observer (or virtual camera) situated in world space. For example, the view volume may be a solid truncated pyramid generated by a 2D view window, a viewpoint located in world space, a front clipping plane and a back clipping plane. The viewpoint may represent the world space location of the virtual observer. In most cases, primitives or portions of primitives that lie outside the 3D view volume are not currently visible and may be eliminated from further processing. Primitives or portions of primitives that lie inside the 3D view volume are candidates for projection onto the 2D view window.

Set-up refers to mapping primitives to a three-dimensional viewport. This involves translating and transforming the objects from their original "world-coordinate" system to the established viewport's coordinates. This creates the correct perspective for three-dimensional objects displayed on the screen.

Screen-space rendering refers to the calculations performed to generate the data used to form each pixel that will be displayed. For example, hardware accelerator 18 may calculate "samples." Samples are points that have color information but no real area. Samples allow hardware accelerator 18 to "super-sample," or calculate more than one sample per pixel. Super-sampling may result in a higher quality image.

Hardware accelerator 18 may also include several interfaces. For example, in the illustrated embodiment, hardware accelerator 18 has four interfaces. Hardware accelerator 18 has an interface 161 (referred to as the "North Interface") to communicate with media processor 14. Hardware accelerator 18 may receive commands and/or data from media processor 14 through interface 161. Additionally, hardware accelerator 18 may include an interface 176 to bus 32. Bus 32 may connect hardware accelerator 18 to boot PROM 30 and/or video output processor 24. Boot PROM 30 may be configured to store system initialization data and/or control code for frame buffer 22. Hardware accelerator 18 may also include an interface to a texture buffer 20. For example, hardware accelerator 18 may interface to texture buffer 20 using an eight-way interleaved texel bus that allows hardware accelerator 18 to read from and write to texture buffer 20. Hardware accelerator 18 may also interface to a frame buffer 22. For example, hardware accelerator 18 may be configured to read from and/or write to frame buffer 22 using a four-way interleaved pixel bus.

The vertex processor 162 may be configured to use the vertex tags received from the media processor 14 to perform ordered assembly of the vertex data from the MPUs 152. Vertices may be saved in and/or retrieved from a mesh buffer 164.

The render pipeline 166 may be configured to rasterize 2D window system primitives and 3D primitives into fragments. A fragment may contain one or more samples. Each sample may contain a vector of color data and perhaps other data such as alpha and control tags. 2D primitives include objects such as dots, fonts, Bresenham lines and 2D polygons. 3D primitives include objects such as smooth and large dots, smooth and wide DDA (Digital Differential Analyzer) lines and 3D polygons (e.g. 3D triangles).

For example, the render pipeline 166 may be configured to receive vertices defining a triangle, to identify fragments that intersect the triangle.

The render pipeline 166 may be configured to handle full-screen size primitives, to calculate plane and edge slopes, and to interpolate data (such as color) down to tile resolution (or fragment resolution) using interpolants or components such as:

r, g, b (i.e., red, green, and blue vertex color);

r2, g2, b2 (i.e., red, green, and blue specular color from lit textures);

alpha (i.e., transparency);

z (i.e., depth); and s, t, r, and w (i.e., texture components).

In embodiments using supersampling, the sample generator 174 may be configured to generate samples from the fragments output by the render pipeline 166 and to determine which samples are inside the rasterization edge. Sample positions may be defined by user-loadable tables to enable stochastic sample-positioning patterns.

Hardware accelerator 18 may be configured to write textured fragments from 3D primitives to frame buffer 22. The render pipeline 166 may send pixel tiles defining r, s, t and w to the texture address unit 168. The texture address unit 168 may use the r, s, t and w texture coordinates to compute texel addresses (e.g. addresses for a set of neighboring texels) and to determine interpolation coefficients for the texture filter 170. The texel addresses are used to access texture data (i.e. texels) from texture buffer 20. The texture buffer 20 may be interleaved to obtain as many neighboring texels as possible in each clock. The texture filter 170 may perform bilinear, trilinear or quadlinear interpolation. The texture environment 180 may apply texels to samples produced by the sample generator 174. The texture environment 180 may also be used to perform geometric transformations on images (e.g., bilinear scale, rotate, flip) as well as to perform other image filtering operations on texture buffer image data (e.g., bicubic scale and convolutions).

In the illustrated embodiment, the pixel transfer MUX 178 controls the input to the pixel transfer unit 182. The pixel transfer unit 182 may selectively unpack pixel data received via north interface 161, select channels from either the frame buffer 22 or the texture buffer 20, or select data received from the texture filter 170 or sample filter 172.

The pixel transfer unit 182 may be used to perform scale, bias, and/or color matrix operations, color lookup operations, histogram operations, accumulation operations, normalization operations, and/or min/max functions. Depending on the source of (and operations performed on) the processed data, the pixel transfer unit 182 may output the processed data to the texture buffer 20 (via the texture buffer MUX 186), the frame buffer 22 (via the texture environment unit 180 and the fragment processor 184), or to the host (via north interface 161). For example, in one embodiment, when the pixel transfer unit 182 receives pixel data from the host via the pixel transfer MUX 178, the pixel transfer unit 182 may be used to perform a scale and bias or color matrix operation, followed by a color lookup or histogram operation, followed by a min/max function. The pixel transfer unit 182 may also scale and bias and/or lookup texels. The pixel transfer unit 182 may then output data to either the texture buffer 20 or the frame buffer 22.

Fragment processor 184 may be used to perform standard fragment processing operations such as the OpenGL® fragment processing operations. For example, the fragment processor 184 may be configured to perform the following operations: fog, area pattern, scissor, alpha/color test, ownership test (WID), stencil test, depth test, alpha blends or logic ops (ROP), plane masking, buffer selection, pick hit/occlusion detection, and/or auxiliary clipping in order to accelerate overlapping windows.

Texture Buffer 20

In one embodiment, texture buffer 20 may include several SDRAMs. Texture buffer 20 may be configured to store texture maps, image processing buffers, and accumulation buffers for hardware accelerator 18. Texture buffer 20 may have many different capacities (e.g., depending on the type of SDRAM included in texture buffer 20). In some embodiments, each pair of SDRAMs may be independently row and column addressable.

Frame Buffer 22

Graphics system 112 may also include a frame buffer 22. In one embodiment, frame buffer 22 may include multiple memory devices such as 3D-RAM memory devices manufactured by Mitsubishi Electric Corporation. Frame buffer 22 may be configured as a display pixel buffer, an offscreen pixel buffer, and/or a super-sample buffer. Furthermore, in one embodiment, certain portions of frame buffer 22 may be used as a display pixel buffer, while other portions may be used as an offscreen pixel buffer and sample buffer.

Figure 6:
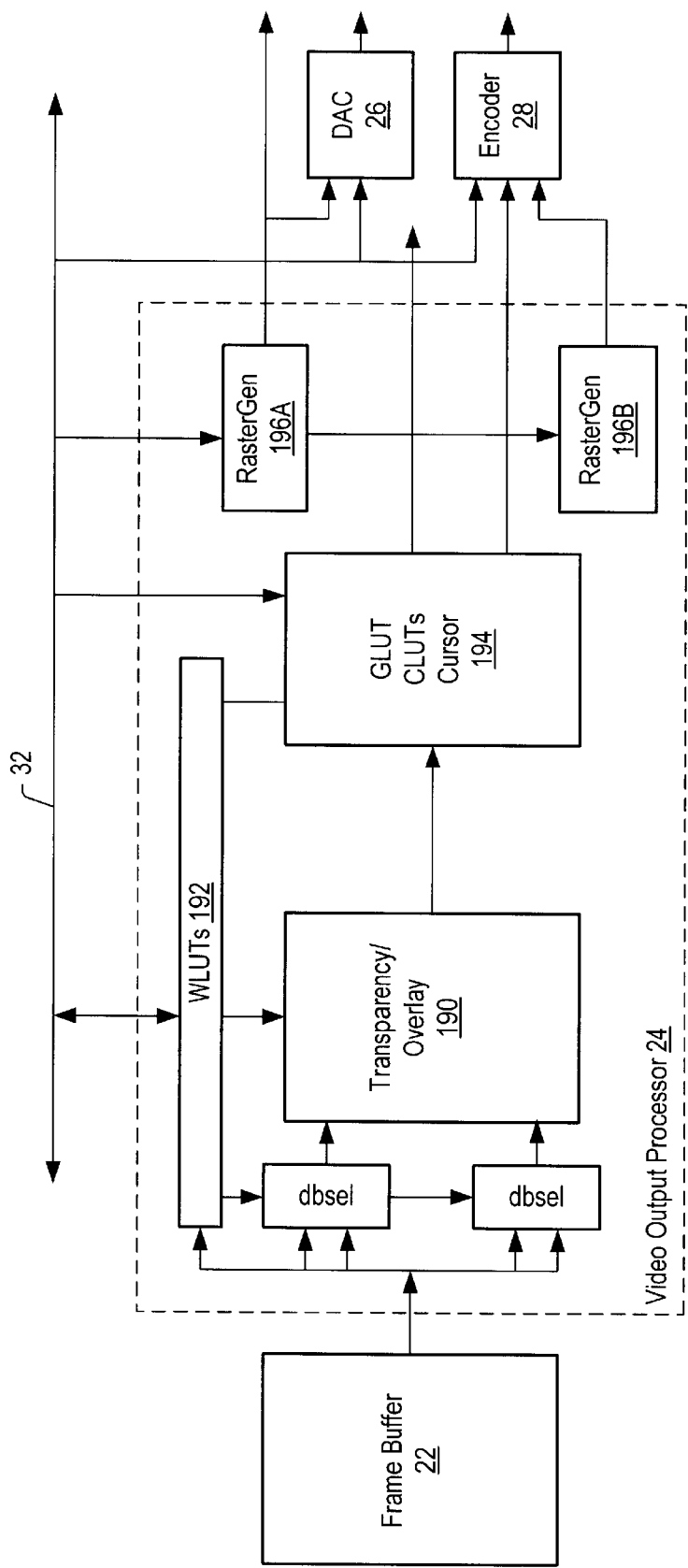
FIG. 6 is a functional block diagram of one embodiment of the video output processor of FIG. 3.

Video Output Processor-FIG. 6

A video output processor 24 may also be included within graphics system 112. Video output processor 24 may buffer and process pixels output from frame buffer 22. For example, video output processor 24 may be configured to read bursts of pixels from frame buffer 22. Video output processor 24 may also be configured to perform double buffer selection (dbsel) if the frame buffer 22 is double-buffered, overlay transparency (using transparency/overlay unit 190), plane group extraction, gamma correction, psuedocolor or color lookup or bypass, and/or cursor generation. For example, in the illustrated embodiment, the output processor 24 includes WID (Window ID) lookup tables (WLUTs) 192 and gamma and color map lookup tables (GLUTs, CLUTs) 194. In one embodiment, frame buffer 22 may include multiple 3DRAM64s (not shown in FIG. 6) that include the transparency overlay 190 and all or some of the WLUTs 192. Video output processor 24 may also be configured to support two video output streams to two displays using the two independent video raster timing generators 196. For example, one raster (e.g., 196A) may drive a 1280×1024 CRT while the other (e.g., 196B) may drive a NTSC or PAL device with encoded television video.

DAC 26 may operate as the final output stage of graphics system 112. The DAC 26 translates the digital pixel data received from GLUT/CLUTs/Cursor unit 194 into analog video signals that are then sent to a display device. In one embodiment, DAC 26 may be bypassed or omitted completely in order to output digital pixel data in lieu of analog video signals. This may be useful when a display device is based on a digital technology (e.g., an LCD-type display or a digital micro-mirror display).

DAC 26 may be a red-green-blue digital-to-analog converter configured to provide an analog video output to a display device such as a cathode ray tube (CRT) monitor. In one embodiment, DAC 26 may be configured to provide a high resolution RGB analog video output at dot rates of 240 MHz. Similarly, encoder 28 may be configured to supply an encoded video signal to a display. For example, encoder 28 may provide encoded NTSC or PAL video to an S-Video or composite video television monitor or recording device.

In other embodiments, the video output processor 24 may output pixel data to other combinations of displays. For example, by outputting pixel data to two DACs 26 (instead of one DAC 26 and one encoder 28), video output processor 24 may drive two CRTs. Alternately, by using two encoders 28, video output processor 24 may supply appropriate video input to two television monitors. Generally, many different combinations of display devices may be supported by supplying the proper output device and/or converter for that display device.

Figure 7:
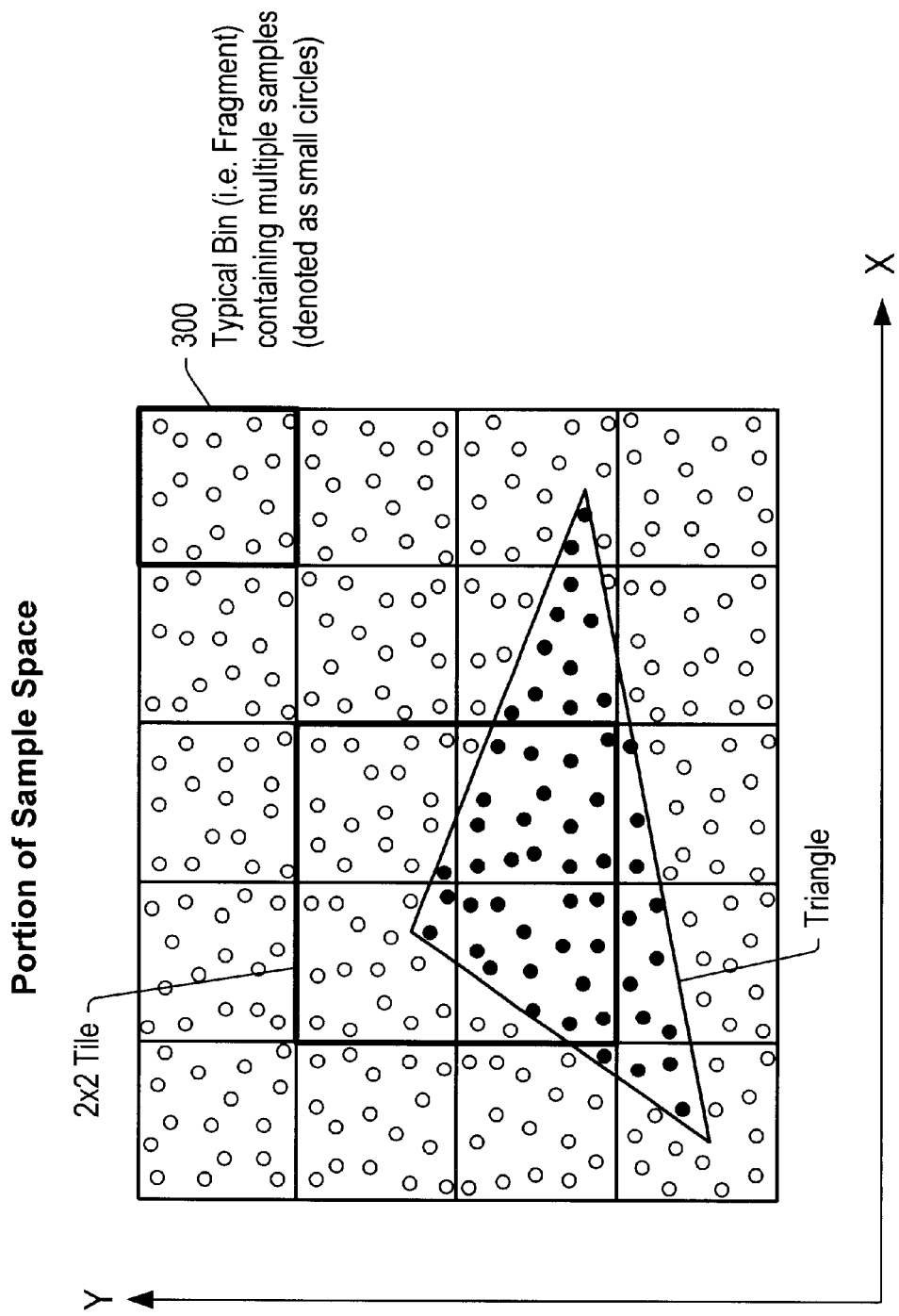
FIG. 7 shows how samples may be organized into bins in one embodiment.

Sample-to-Pixel Processing Flow-FIG. 7

In one set of embodiments, hardware accelerator 18 may receive geometric parameters defining primitives such as triangles from media processor 14, and render the primitives in terms of samples. The samples may be stored in a sample storage area (also referred to as the sample buffer) of frame buffer 22. The samples are then read from the sample storage area of frame buffer 22 and filtered by sample filter 172 to generate pixels. The pixels are stored in a pixel storage area of frame buffer 22. The pixel storage area may be double-buffered. Video output processor 24 reads the pixels from the pixel storage area of frame buffer 22 and generates a video stream from the pixels. The video stream may be provided to one or more display devices (e.g., monitors, projectors, head-mounted displays, and so forth) through DAC 26 and or video encoder 28.

The samples are computed at positions in a two-dimensional sample space (also referred to as rendering space). The sample space may be partitioned into an array of bins (also referred to herein as fragments). The storage of samples in the sample storage area of frame buffer 22 may be organized according to bins (e.g., bin 300) as illustrated in FIG. 7. Each bin may contain one or more samples. The number of samples per bin may be a programmable parameter.

Scale & Bias Operations

Figure 8:
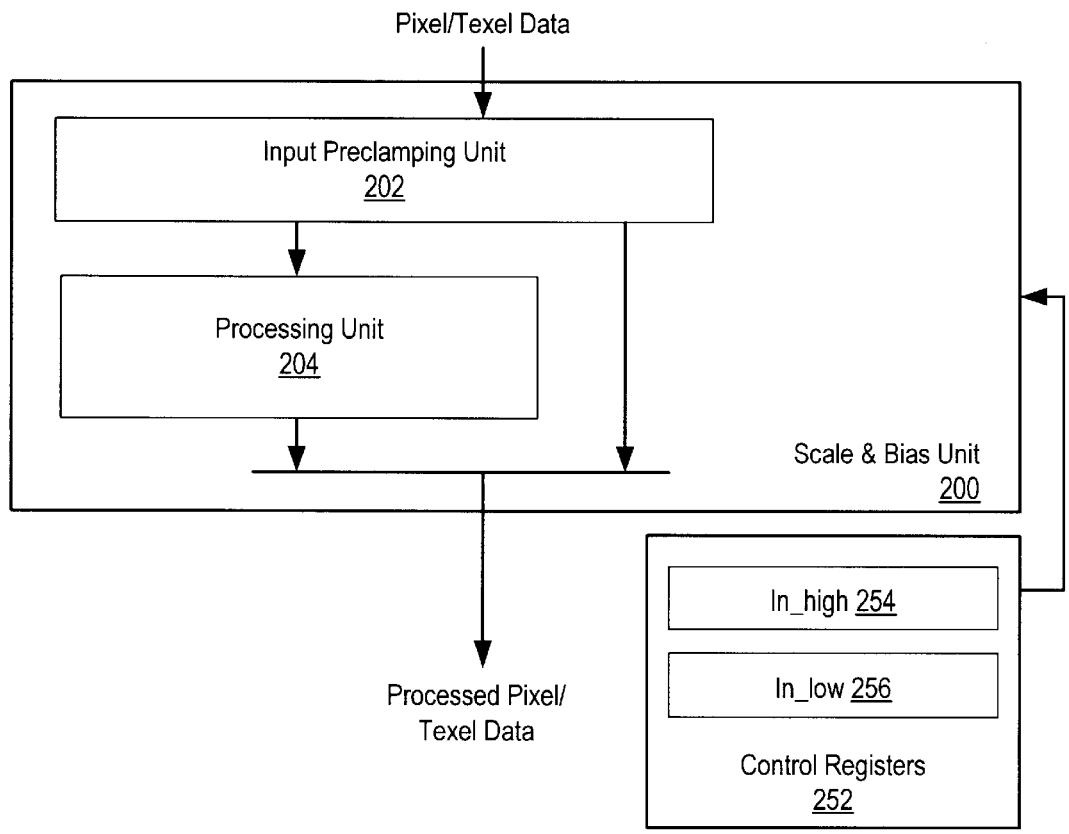
FIG. 8 shows a block diagram of one embodiment of a portion of a graphics system.

FIG. 8 shows one embodiment of a portion of a graphics system that may be configured to perform scale and bias operations. The components of FIG. 8 may be included in a graphics system (e.g., in a pixel transfer unit 182) such as the one described above with respect to FIGS. 1-7.

In FIG. 8, graphics data (e.g., one or more pixels or texels) is input to a scale and bias unit 200. In this embodiment, the scale and bias unit 200 includes a preclamping unit 202 and a processing unit 204. The scale and bias unit 200 may be configured to perform computations used to scale and bias an input pixel, to scale an input pixel and add the results to an accumulation buffer, to blend an input pixel into an accumulation buffer, and/or to perform color space conversion of an input pixel using a color matrix operation. The processing unit 204 may perform multiplication and addition in order to perform operations such as output=input*scale+bias. In one embodiment, color matrix operations may be performed by passing a set of inputs through the processing unit 204 several times and accumulating the intermediate results in an adder (not shown). Several preclamping and/or processing units may be included in some embodiments so that different channels (e.g., R, G, B, and A) may be processed in parallel.

The scale and bias unit 200 is coupled to a set of control registers 252. The control registers may include one or more registers 254 that each store a high input value and one or more registers 256 that each store a low input value, as will be described in more detail below.

Figure 9:
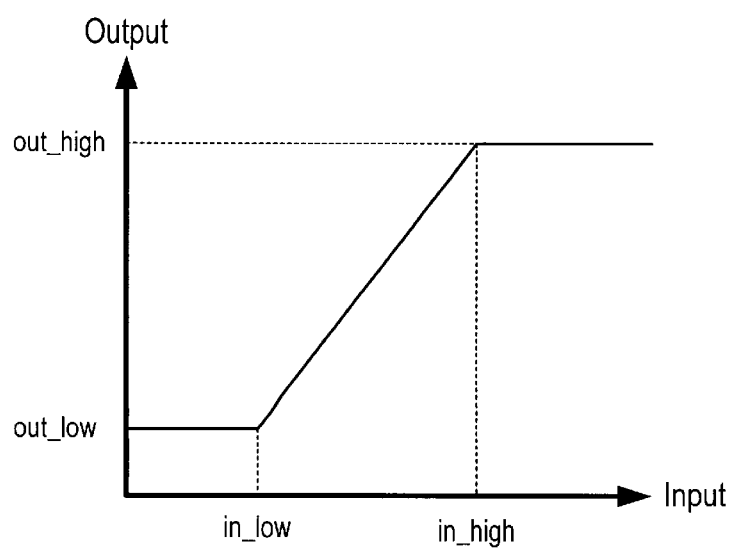
FIGS. 9-11B show exemplary plots of a scale and bias operation output as a function of the scale and bias operation inputs.

Typically, scale and bias operations are linear operations of the form output=input*scale+bias. The scale and the bias values may be floating-point numbers in the −infinity to +infinity range. Floating-point operations are typically expensive to perform (in terms of processing time and/or hardware), and thus the scale and bias computation may be a relatively expensive operation. However, for certain scale and bias operations, the range of output values is limited. For example, certain scale and bias operations may produce outputs that are restricted, or clamped, between two limits (e.g., from 0 to 1 or from −1 to 1). In FIG. 9, an exemplary graph of the output of a scale and bias function as a function of input is shown. Here, the output is clamped between out_low and out_high. Because scale and bias operations are linear operations, the output of the scale and bias operation for inputs greater than or equal to in_high will be out_high. Similarly, the output for inputs less than or equal to in_low will be out_low. The ranges of inputs that produce the same output (out_high or out_low) are referred to as saturation ranges. The preclamping unit 202 may select inputs in the saturation ranges (e.g., by performing subtraction operations like those described below) and output the appropriate output, out_high or out_low, instead of providing the saturation-range inputs to the processing unit 204. Thus, by preclamping the inputs, the relatively expensive scale and bias calculation (performed by processing unit 204) may be bypassed for certain inputs. Accordingly, by preclamping the inputs, the efficiency of the scale and bias unit 200 may be increased.

In some embodiments, once the in_high, in_low, out_high, and out_low values are known, the scale and bias operation may be redefined as output=out_low+(in−in_low)*scale. (In an alternative embodiment, the operation may be redefined as output=out_high−(in_high−in)*scale.) As a result, the processing unit 204 may include a subtractor, an adder, and a multiplier.

In_high, in_low, out_high, and out_low may be fixed-point numbers. In one embodiment, the scale may be represented as a fraction*$2^{exponent}$. The difference in−in_low may be calculated and then pre-shifted left by a specified amount (the amount of shifting may be calculated in hardware or software). The shifted difference may then be multiplied by the fraction (or mantissa) from the scale. The result of the multiplication may be post-shifted left by another pre-specified amount and added to out_low to produce the output of the scale and bias operation. In such an embodiment, a fixed-point multiplier may be used to perform the multiplication, even though the scale is a floating-point number. This may decrease the expense of the scale and bias operation in some embodiments.

In one embodiment, the processing unit 204 may also include a post-clamping unit (not shown) to clamp output values to a certain range.

The current scale and bias values may be used to determine the relationship between the input and output values (e.g., whether the output is increasing or decreasing with increasing input values) for a particular operation. This relationship may then be used to determine the input values in_low and in_high for that operation. In one embodiment, software (e.g., a device driver program executed by a host computer system 102 and stored in a memory 106 (e.g., as shown in FIG. 2)) may perform the calculations to determine in_high and in_low. In other embodiments, this determination may be performed in hardware.

Figure 10A:
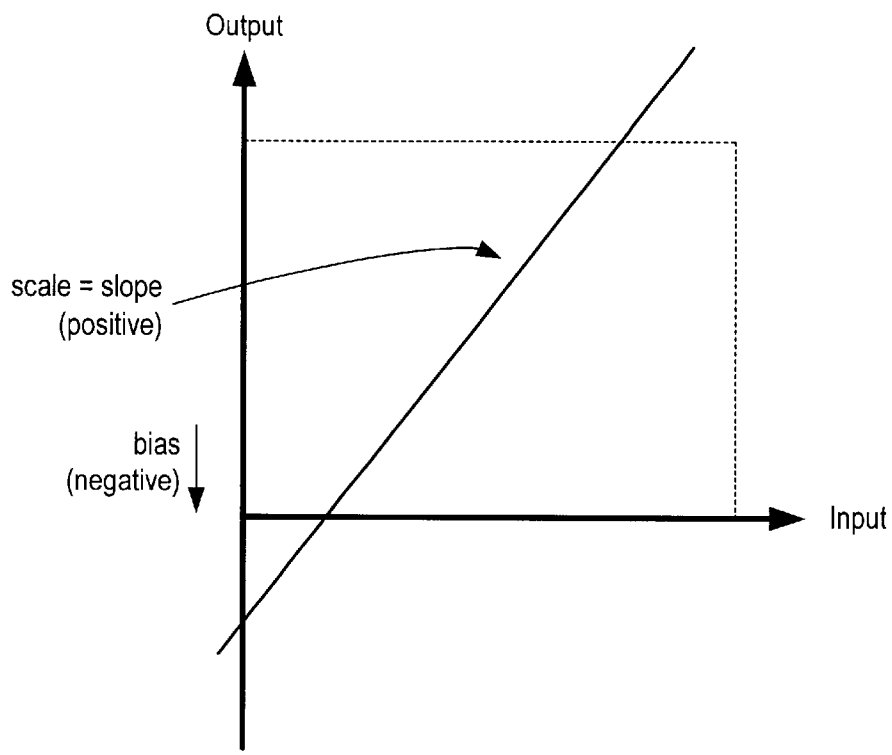
Figure 10B:
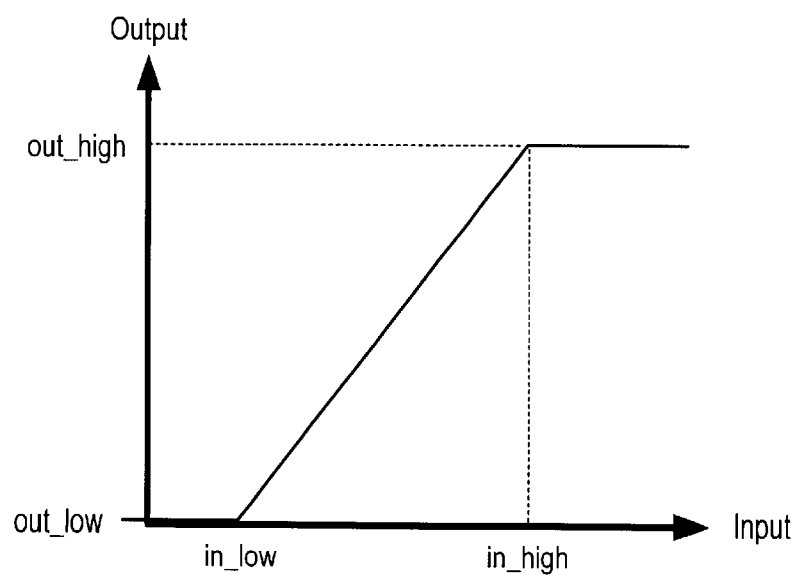

FIGS. 10A–11B show exemplary graphs of the relationship between the input and output values for different scale and bias values. In FIG. 10A, the unclamped output is shown as a function of the input. In this example, the scale, which determines the slope of the line, is positive and the bias is negative. Here, the output is increasing with increasing input values. FIG. 10B shows the a graph of the clamped output range and the corresponding in_low and in_high values for the same scale and bias values used in FIG. 10A. Note that inputs in the saturation regions (greater than or equal to in_high and lower than or equal to in_low may be detected by a preclamping unit 202 like the one shown above and the output (out_high or out_low) may be generated for those inputs without having to use a processing unit 204. However, a processing unit 204 may operate on inputs between in_low and in_high.

Figure 11A:
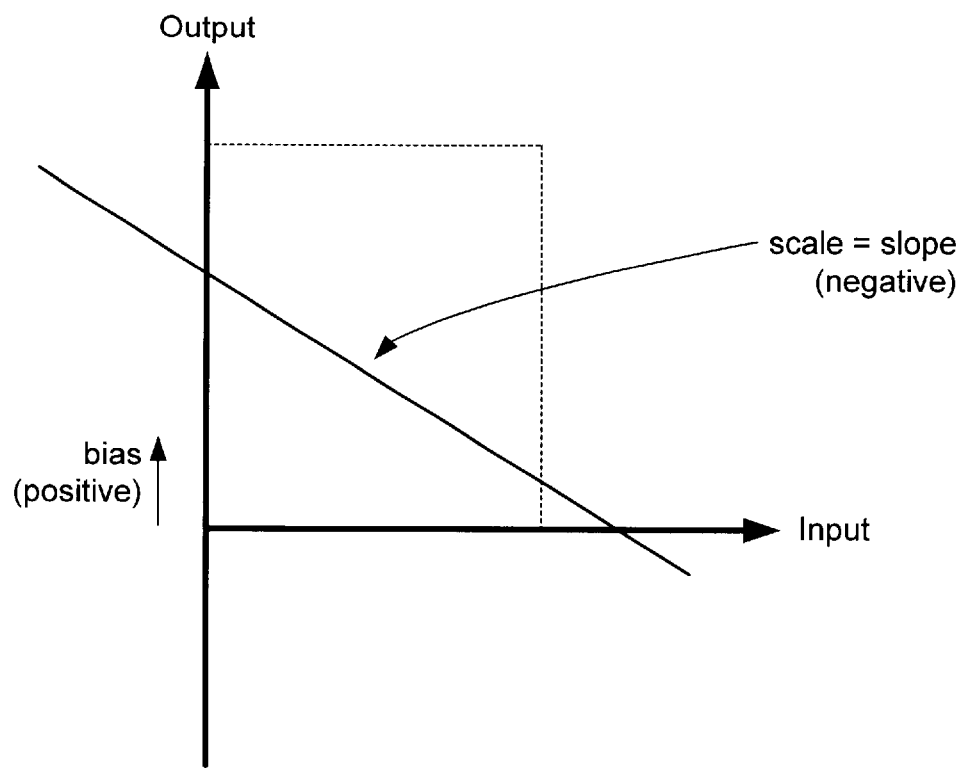
Figure 11B:
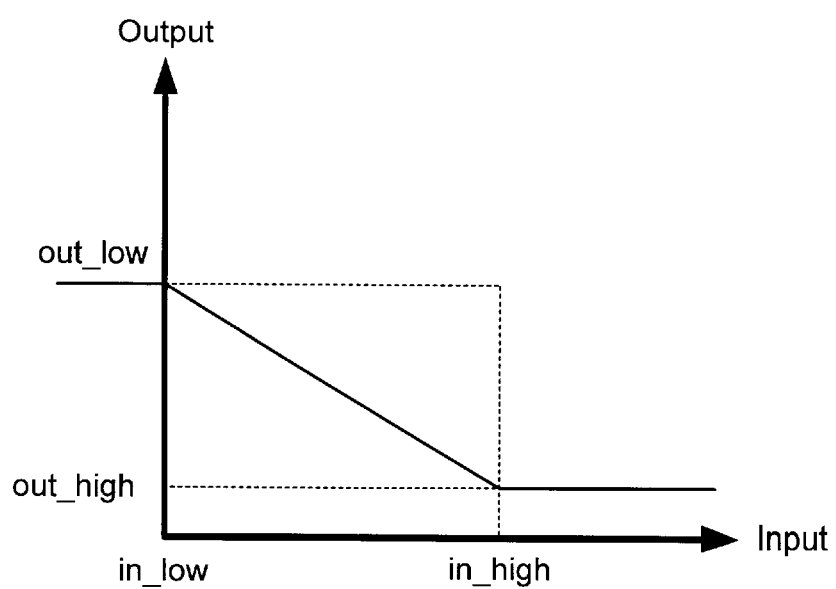

FIG. 11A shows a graph of the unclamped output relative to the input for a different set of scale and bias values. In this example, the scale is negative and the bias is positive. Consequentially, output values decrease as input values increase. FIG. 11B shows the clamped output (clamped between out_low and out_high) as a function of the input for the same scale and bias values. Note that FIGS. 10–11 are merely exemplary and that other scale and bias values may be used in other embodiments.

In one embodiment, the preclamping unit 202 may also perform the first stage of the scale and bias calculation (e.g., by calculating the difference in−in_low). For example, as mentioned above, the scale and bias operation may be redefined as output=out_low+(in−in_low)*scale. The preclamping unit 202 may calculate in−in_low and in−in_high to determine whether the current input value is a saturation-range input. If in−in_low is negative or zero, the preclamping unit 202 may output out_low as the result and bypass the processing unit 204. The preclamping unit 202 may also calculate in−in_high. If the result of the subtraction is non-negative, the preclamping unit 202 may output out_high as the result and bypass the processing unit 204. In one embodiment, the preclamping unit may include several subtractors so that multiple subtractions (e.g., to check for both saturation input ranges for a particular input) can be performed in parallel. In some embodiments, the subtractions for several channels (e.g., R, G, B, and A) may be performed in parallel. If the result of the in−in_low subtraction is not negative or zero and the result of the in−in_high subtraction is negative or zero, the preclamping unit 202 may pass the result of the in−in_low subtraction to the processing unit 204 for further processing.

Color matrix operations may include one or more scale and bias operations. In some embodiments, the output of a color matrix operation may be clamped. For example, if the output of a color matrix operation is input to a LUT (Lookup Table) and inputs to the LUT are clamped to a certain range, the inputs to the color matrix operation may be clamped. As a result, the outputs of the color matrix operation may be clamped to the range specified for the inputs to the LUT. Thus, the preclamping unit 202 may also preclamp the inputs to the color matrix unit 206.

FIGS. 12A and 12B show an exemplary color matrix and the equations defining a color matrix operation that may be performed by a scale and bias unit 200. FIG. 12A shows an exemplary 4×4 color matrix. FIG. 12A also shows how a color matrix operation may be defined as a scale and bias operation. As shown, the input may include four channels (R, G, B, and A). The output (R', G', B', and A') may be calculated by summing the products of each input channel with the matrix terms in an associated row of the matrix, multiplying this sum by a scale, and adding a bias to the product. The output may be calculated in a processing unit 204 by passing each input through a multiplier four times (once for each matrix element in the appropriate matrix row) and accumulating the result. The result may then be passed through the multiplier to multiply the result with the scale. The product may then be provided to an adder to be combined with the bias. The multiplier may be a fixed-point multiplier and the multiplication may be performed as described above in some embodiments. Note that each input channel may have associated scale and bias values.

For color matrix operations, the each input channel may be preclamped as described above for a scale and bias operation.

In some embodiments, the scale may be combined with the color matrix elements to produce a color matrix like the one shown in FIG. 12B. For example, n1 may equal m1*scale, n2 may equal m2*scale, and so on. As a result, the scale and bias operation used in the color matrix operation may be simplified, as shown in the equation of FIG. 12B. This may decrease the number of times a multiplier is used in the color matrix operation in some embodiments. In one embodiment, the color matrix parameters n may be calculated by software.

Note that in some embodiments, 3×3 color matrix operations may be performed on three input channels (e.g., R, G, and B).

Figure 13:
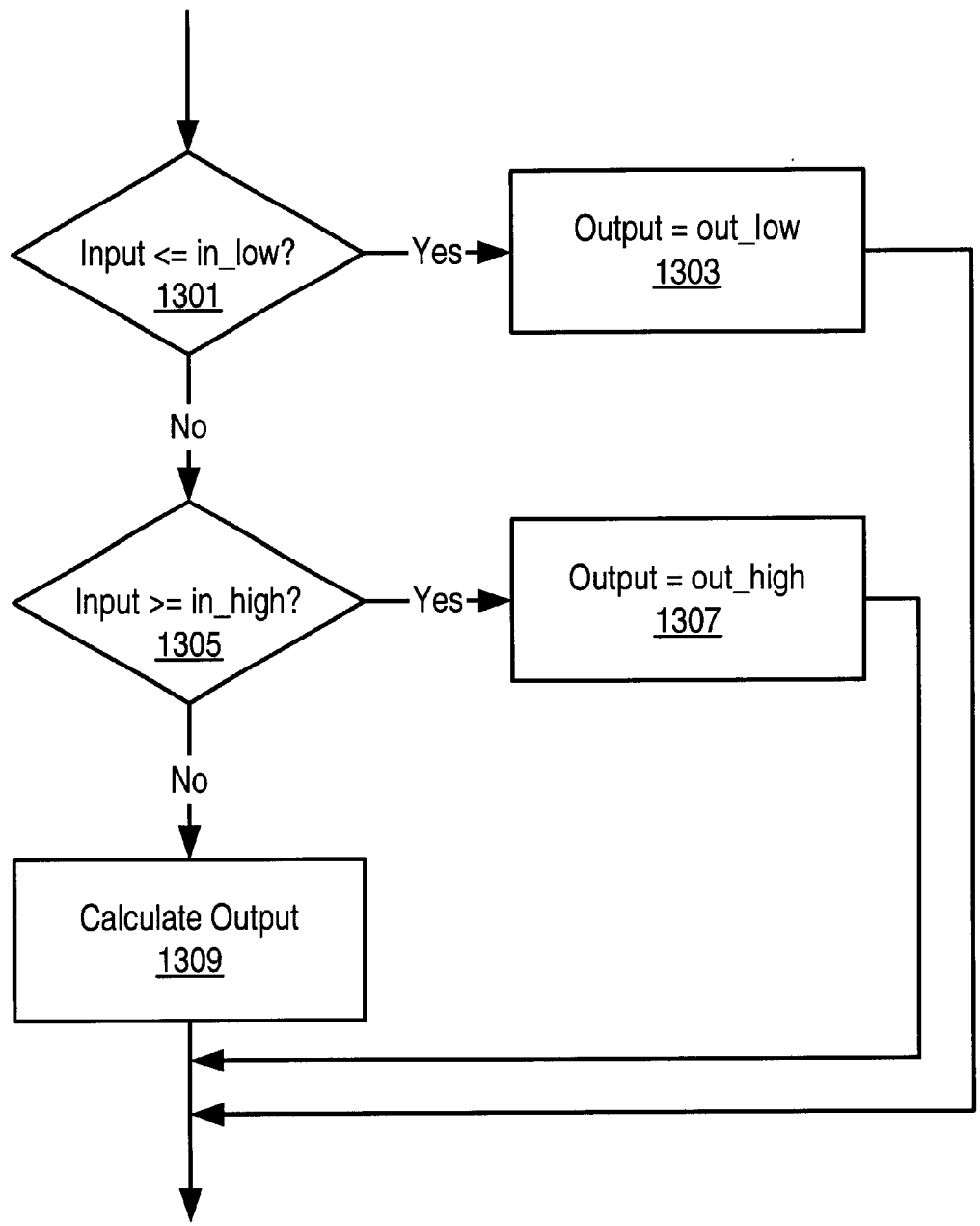
FIG. 13 is a flowchart of one embodiment of a method of performing a scale and bias operation.

FIG. 13 shows one embodiment of a method of performing a scale and bias operation. Note that a color matrix operation may be performed as a scale and bias operation in some embodiments. The values of in_high, in_low, out_high, and/or out_low may be determined in software and/or hardware.

At 1301, if the input is less than or equal to in_low, the output is out_low and further processing (e.g., by a multiplier) may be skipped, as shown at 1303. Similarly, if the input is greater than or equal to in_high, the output is out_high and further processing may be skipped, as shown at 1305–1307. Otherwise, the output may be calculated (e.g., by a processing unit 204), as shown at 1309.

Exemplary Scale and Bias Unit

Figure 14:
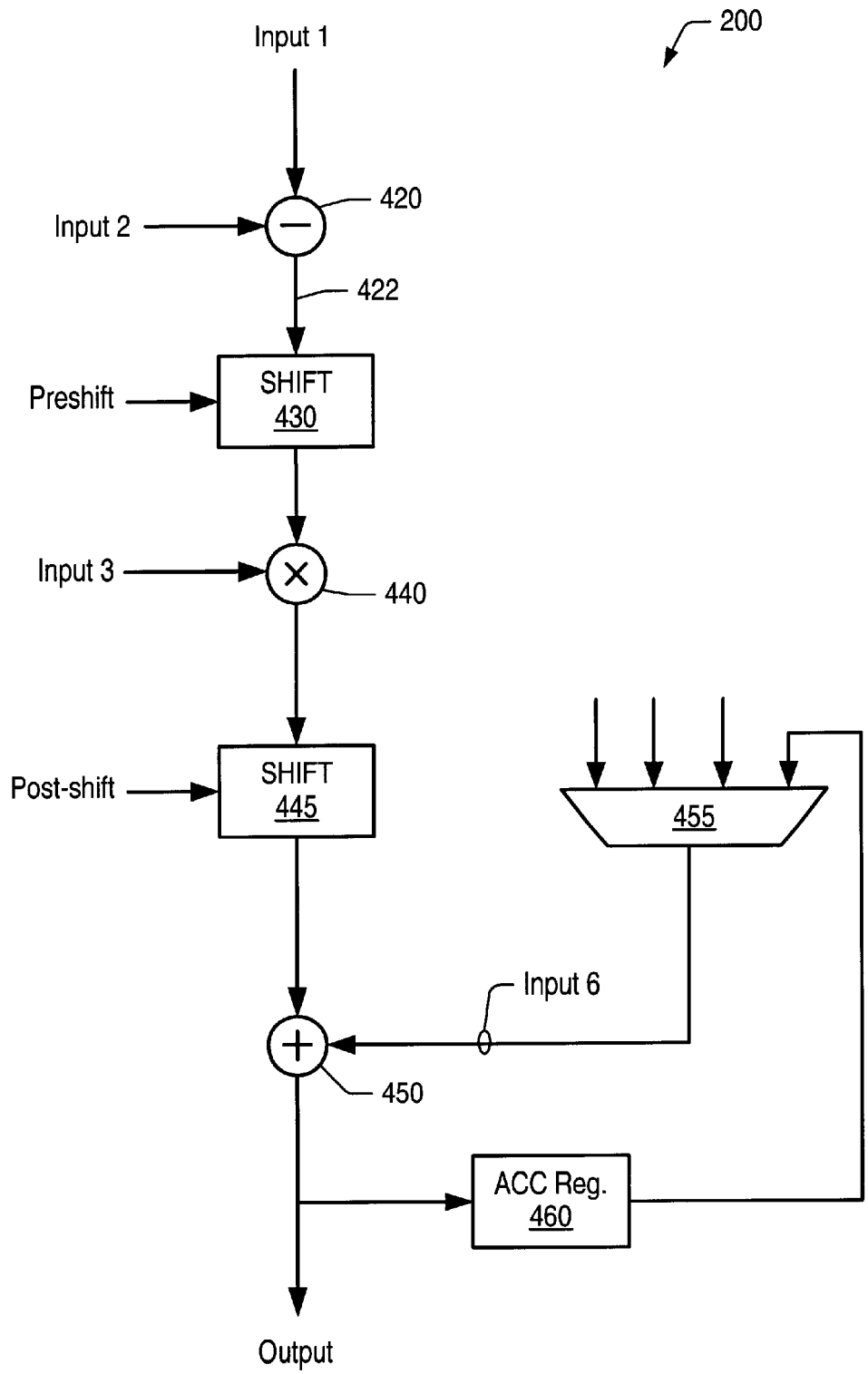
FIGS. 14-15 show exemplary embodiments of a scale and bias unit that may be included in a graphics system.
Figure 15:
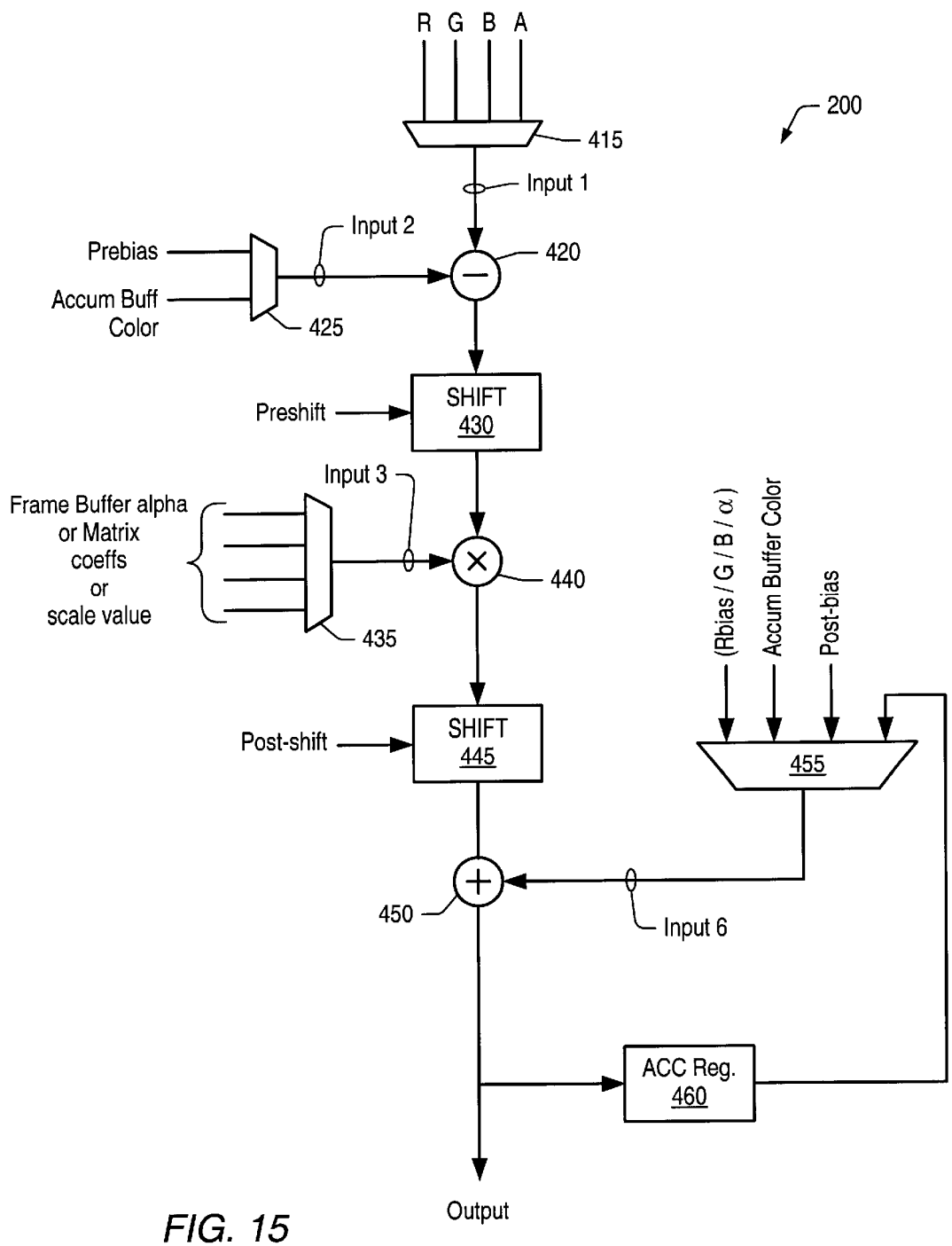

FIGS. 14 and 15 illustrate exemplary embodiments of a scale and bias unit 200. In these embodiments, the scale and bias unit 200 may be configured to perform multiple different operations in addition to scale and bias operations. Note that other embodiments may be configured differently. As illustrated in FIG. 14, the scale and bias unit 200 may include a subtraction unit 420 (e.g., in preclamping unit 202), a shift unit 430, a multiplier 440, a shift unit 445, an adder 450, a multiplexer 455, and an accumulation register 460. The scale and bias unit 200 operates on one or more input pixels and to generate one or more output pixels.

To implement a dynamic mixing operation, a color component of an image pixel $X_K(I,J)$ from the image buffer in frame buffer 22 may be provided to Input1, and the corresponding color component of an accumulation buffer pixel $A_K(I,J)$ may be provided to Input2 and to Input6 (through multiplexer 455). The α component of the image pixel $X_K(I,J)$ may be provided to Input3. The output value OUTPUT may be sent back to an accumulation buffer.

The shift units 430 and 445 may allow the scale and bias unit 200 to shift the outputs of subtractor 420 and multiplier 440 respectively. In one embodiment, the shift units may be left shift units. Shift unit 430 may be controlled by a preshift value and the shift unit 445 may be controlled by a post-shift value. The preshift and postshift values may be determined by driver software (e.g., software executing on host processor 102). Driver software may write to a preshift register and postshift register (e.g., in control registers 252). In one embodiment, shift unit 420 may be used to remove leading zeros from an operand provided on pathway 422.

To implement a load operation (e.g., a GL_LOAD operation), a component of an image pixel from the image buffer in the frame buffer 22 may be provided to Input1. The value zero may be provided to Input2. A programmable scale factor may be provided to Input3. Input6 may be set to zero. The output value OUTPUT may be transferred to an accumulation buffer.

To implement a return operation (e.g., a GL_RETURN operation), a component $CC_A$ of an accumulation buffer pixel may be provided to pathway 422, a programmable scale factor may be provided to Input3, and Input6 may be set to zero. The pathway 422 may be provided with the component $CC_A$ in any of various ways. For example, $CC_A$ may be provided to Input1 and zero may be provided to Input2. The output value OUTPUT may be transferred to the frame buffer 22 (e.g., to an image buffer in frame buffer 22).

To implement an add operation (e.g., a GL_ADD operation), a component $CC_A$ of an accumulation buffer pixel may be provided to pathway 422, the value one may be provided at Input3 for the scale factor, and a programmable bias value may be provided at Input6 (e.g., a selecting an input line of multiplexer 455 which couples to a bias value register). The output value OUTPUT may be sent to an accumulation buffer (e.g., in texture buffer 20).

The pathway 422 may be provided with the component $CC_A$ in any of various ways. For example, in one alternative embodiment, subtraction unit 420 (which may include an internal adder and a two's complement unit) may have an alternative path around its two's complement unit, e.g., an alternative path that goes from Input2 to an input port of the internal adder. When the bypass path is enabled, Input2 goes directly to the internal adder port. Thus, the component $CC_A$ may be provided to path 422 by providing the component $CC_A$ to Input2, zero to Input1, and enabling the alternative path.

To implement a multiply operation (e.g., a GL_MULT operation), a component $CC_A$ of an accumulation buffer pixel may be provided to pathway 422, a programmably-determined value may be provided at Input3 for the scale factor, and the value zero may be provided at Input6. The output value OUTPUT may be sent to an accumulation buffer (e.g., in texture buffer 20).

To implement an accumulate operation (e.g., a GL_ACCUM operation), a component of an image pixel from the image buffer in the frame buffer 22 may be provided to Input1. The value zero may be provided to Input2. A programmable scale factor may be provided to Input3. The corresponding component of accumulation buffer pixel $A_K(I,J)$ may be provided to Input6 (via multiplexer 455). The output value OUTPUT may be transferred to an accumulation buffer (e.g., in texture buffer 20).

In one embodiment, the pixel transfer unit 182 may include four copies of the scale and bias unit 200. Thus, the pixel transfer unit 182 may operate on four input channels simultaneously. For example, the four input channels may be allocated respectively to the four pixel components (R, G, B, and A). Thus, in at least some operational modes (e.g., in the load, return, add, multiply and accumulate modes), the pixel transfer unit 182 may compute all four components for a single pixel in parallel.

Furthermore, the pixel transfer unit 182 may be configured to operate on more than one pixel simultaneously. For example, two pixels may be processed per clock under the assumption that each pixel uses two channels. Alternatively, four pixels may be processed per clock under the assumption that each pixel uses one channel.

In the dynamic mixing operation, the alpha component of the image pixel may be used to determine the blend factor for the red, green and blue components, and thus, the alpha component may not experience the same kind of mixing as the red, green and blue components.

To implement a matrix-vector multiplication Z=C*U, e.g., a color space conversion, each component $Z_L$ of the output vector may be assigned to a corresponding copy of the scale and bias unit 200. Each copy of the scale and bias unit 200 may receive the components $U_M$ of the input vector over successive clock cycles and multiply each component $U_M$ by the matrix coefficient $C_{LM}$. A sum of the products $C_{LM}*U_M$ may be accumulated in accumulator register 460. The input vector components may be presented successively at Input1. Input2 may be set to zero. The matrix coefficients $C_{LM}$ may be multiplexed into Input3 over the successive cycles. The output of accumulator register 460 may be fed back through multiplexer 455 to adder 450 through Input6.

Three copies of the scale and bias unit 200 may be used in parallel to perform a 3×3 matrix multiply. Four copies of the scale and bias unit 200 may be used in parallel to perform a 4×4 matrix multiply.

The matrix multiplication modes may be used to perform any of the following color space conversions: YUV to RGB; 422YUV to RGB (each 422YUV input pixel may produce two RGB pixels of output); RGB to RGB; RGBα to RGBα.

Scale and bias unit 200 may include a set of multiplexers so that appropriate values are supplied to each of the inputs Input1, Input2, Input3 and Input6 for each operational mode. For example, in one embodiment, scale and bias unit 200 may include multiplexers 415, 425, 435 and 455 as indicated in FIG. 15.

The multiplexer 425 may select between a pre-bias value and accumulation buffer pixel color.

The multiplexer 435 may select between matrix coefficients in matrix multiply mode. In dynamic blending mode, multiplexer 435 passes the frame buffer α value. In multiply mode, multiplexer 435 passes the registered scale value (i.e., a programmably determined scale value).

Multiplexer 455 provides one of a color bias constant, the accumulation buffer pixel color, a post-bias constant, or accumulator register 460's contents to Input6. The color bias constant may be useful in certain color space conversions. The post-bias constant may be used in an add operation. The accumulation buffer pixel color may be selected during a dynamic mixing operation.

Pixel transfer unit 182 may also include a control unit (not shown). The control unit may drive the control lines (i.e., the select lines) of the multiplexers through one or more cycles to implement the various operations described above. The control unit may respond to a value stored in a control register. The value stored in the control register may be programmably determined (e.g., by a device driver).

In one embodiment, the inputs to the pixel transfer unit 182 may be four channels of pixel data (e.g., one 4-channel pixel, two 2-channel pixels, or four 1-channel pixels). The pixel transfer unit 182 may also receive a three-channel accumulation buffer pixel during the dynamic blending mode.

The pixel transfer unit 182 may include a set of registers that store operational parameters such as scale value, shift values, bias values, matrix coefficients, and so on. For example, 16 scale values may be stored to support 4×4 matrix operation. The control unit may cycle through the different channels of input data and select the correct combination of inputs and register values to perform the desired operation.

In other embodiments, pixel transfer unit 182 may include more than or less than four copies of scale and bias unit 200.

Although the embodiments above have been described in considerable detail, other versions are possible. Numerous variations and modifications will become apparent to those skilled in the art once the above disclosure is fully appreciated. It is intended that the following claims be interpreted to embrace all such variations and modifications. Note the section headings used herein are for organizational purposes only and are not meant to limit the description provided herein or the claims attached hereto.

What is claimed is:

1. A method for performing a specified linear scale and bias operation on floating point graphics data using a fixed-point multiplier, wherein the method comprises:

specifying floating point values for scale and bias;

specifying floating point high and low limits on input and output values for each specific type of graphics data;

receiving an input value, wherein each input value comprises one or more graphics data values; and performing a specified linear scale and bias operation on the input values to generate output values between the corresponding low and high output value limits, if the input value is greater than the low input limit and less than the high input limit;

wherein said performing comprises:

calculating a difference between the input value and the low input limit;

pre-shifting the difference by a predetermined amount;

multiplying the shifted difference by the mantissa of the scale value using a fixed-point multiplier and outputting a resulting product;

post-shifting the product by another predetermined amount; and adding the post-shifted result to the low output limit.

2. The method of claim 1, wherein the input value comprises one or more color values for a pixel, and wherein the color values are determined from a corresponding set of vertex data for a polygon.

3. The method of claim 1, further comprising:

comparing the input value to high and low input limits;

outputting an output value equal to the low output limit, if the input value is less than or equal to the low input limit; or outputting an output value equal to the high output limit, if the input value is greater than or equal to the high input limit.

4. The method of claim 1, further comprising storing the output value in an accumulation register.

5. The method of claim 4, further comprising:

receiving a second input value;

repeating said performing for the second input value to generate a new output value; and adding the new output value to the output value stored in the accumulation register.

6. A system for performing a specified linear scale and bias operation on floating point graphics data using a fixed-point multiplier, wherein the system comprises:

a subtractor configured to output a difference between an input value and a corresponding low input limit;

a first shifter configured to shift the difference by a first predetermined amount and output the shifted difference;

a fixed point multiplier configured to multiply the shifted difference by a scale mantissa of a specified floating point scale and output a result;

a second shifter configured to shift the result by a second predetermined amount and output the shifted result; and an adder configured to add the post-shifted result to the low output limit.

7. The system of claim 6, wherein the input value comprises one or more color values for a pixel, and wherein the color values are determined from a corresponding set of vertex data for a polygon.

8. The system of claim 6, further comprising a preclamping unit configured to:

receive an input value; and responsively generate an output value, wherein said output value is generated if the input value is less than or equal to the low input limit or greater than or equal to the high input limit.

9. The system of claim 8, wherein the preclamping unit outputs an output value equal to the high output limit, if the input value is greater than or equal to the high input limit, and wherein the preclamping unit outputs an output value equal to the low output limit, if the input value is less than or equal to the low input limit.

10. The system of claim 6, further comprising an accumulation register for storing the output value.

11. The system of claim 10, further configured to:

receive a second input value;

repeat said performing for the second input value to generate a new output value; and add the new output value to the output value storedi n the accumulation register.

* * * * *

UNITED STATES PATENT AND TRADEMARK OFFICE
CERTIFICATE OF CORRECTION

PATENT NO. : 6,847,378 B2
DATED : January 25, 2005
INVENTOR(S) : Oberoi et al.

It is certified that error appears in the above-identified patent and that said Letters Patent is hereby corrected as shown below:

Column 18,
Line 24, please delete "storedi n" and substitute -- Stored in: --.

Signed and Sealed this

Twenty-sixth Day of April, 2005

JON W. DUDAS
*Director of the United States Patent and Trademark Office*